US010670002B2

(12) United States Patent
Van Keulen et al.

(10) Patent No.: US 10,670,002 B2
(45) Date of Patent: Jun. 2, 2020

(54) PLURAL COMPONENT PROPORTIONER COMPRISING A FIRST PUMP AND A SECOND PUMP SIMULTANEOUSLY DRIVEN BY A MOTOR CONNECTED TO THE PUMPS BY A YOKE ASSEMBLY COMPRISING A SHOE, A TIE PLATE INCLUDING A SLOT, AND A TIE ROD

(71) Applicant: Graco Minnesota Inc., Minneapolis, MN (US)

(72) Inventors: Dennis J. Van Keulen, Rogers, MN (US); Vannareth J. Chum, Farmington, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 408 days.

(21) Appl. No.: 15/536,172

(22) PCT Filed: Dec. 14, 2015

(86) PCT No.: PCT/US2015/065527
§ 371 (c)(1),
(2) Date: Jun. 15, 2017

(87) PCT Pub. No.: WO2016/100197
PCT Pub. Date: Jun. 23, 2016

(65) Prior Publication Data

US 2018/0135608 A1 May 17, 2018

Related U.S. Application Data

(60) Provisional application No. 62/092,905, filed on Dec. 17, 2014.

(51) Int. Cl.
*F04B 23/06* (2006.01)
*B29B 7/74* (2006.01)
(Continued)

(52) U.S. Cl.
CPC ................ *F04B 23/06* (2013.01); *B05B 7/32* (2013.01); *B05B 9/0409* (2013.01);
(Continued)

(58) Field of Classification Search
CPC .......... F04B 1/02; F04B 9/129; F04B 9/1295; F04B 9/131; F04B 23/0206; F04B 13/02;
(Continued)

(56) References Cited

U.S. PATENT DOCUMENTS 2,925,780 A * 2/1960 Tear ........................ F04B 13/02
417/399
3,196,802 A 7/1965 Matheny
(Continued)

FOREIGN PATENT DOCUMENTS

CN 1596070 A 3/2005
CN 1711208 A 12/2005
(Continued)

OTHER PUBLICATIONS

Second Chinese Office Action for CN Application No. 20158006358.8, dated Jun. 20, 2019, pp. 5.
(Continued)

*Primary Examiner* — Devon C Kramer
*Assistant Examiner* — Benjamin Doyle
(74) *Attorney, Agent, or Firm* — Kinney & Lange, P.A.

(57) ABSTRACT

A two-component pumping system includes a first pump for pumping a first component, a second pump for pumping a second component, a motor, and a yoke assembly for connecting the motor to the first pump and the second pump and driving them simultaneously. The first pump includes a first displacement rod that reciprocates in a first pump axis. The second pump includes a second displacement rod that reciprocates in a second pump axis parallel to the first pump axis. The motor includes a drive shaft configured to recip-
(Continued)

rocate in a drive axis that is parallel to and in a common plane with the first and second pump axes. The motor is also configured to drive the first and second displacement rods in unison. The yoke assembly includes a top connector and a shoe. The top connector connects to the drive shaft.

20 Claims, 5 Drawing Sheets

(51) Int. Cl.

| | |
|---|---|
| ***F04B 23/02*** | (2006.01) |
| ***F04B 9/129*** | (2006.01) |
| ***F04B 13/02*** | (2006.01) |
| ***B05B 7/32*** | (2006.01) |
| ***B05B 9/04*** | (2006.01) |
| ***B05B 12/14*** | (2006.01) |
| ***B23P 19/04*** | (2006.01) |
| ***F04B 19/02*** | (2006.01) |
| ***F04B 35/04*** | (2006.01) |
| ***B05B 7/24*** | (2006.01) |

(52) U.S. Cl.

CPC .......... *B05B 12/1445* (2013.01); *B23P 19/04* (2013.01); *B29B 7/7447* (2013.01); *F04B 9/129* (2013.01); *F04B 13/02* (2013.01); *F04B 19/022* (2013.01); *F04B 23/02* (2013.01); *F04B 35/04* (2013.01); *B05B 7/2489* (2013.01)

(58) Field of Classification Search

CPC .......... F04B 13/00; F04B 23/06; F04B 53/22; F04B 23/02; F04B 23/025; B05B 12/1445; B05B 12/1418; B05B 11/3084; B05B 12/14; B05B 9/03; B05B 9/0413; B29B 7/603; B29B 7/7404; B29B 7/7626; B01F 15/0462; B01F 15/0237; B01F 15/0201; B01F 15/0454; B01F 2215/005; G01F 11/021; G01F 11/023; B67D 7/74

USPC .......... 417/521, 529; 222/145.6, 386.5, 596; 239/303, 304, 329

See application file for complete search history.

(56) References Cited

U.S. PATENT DOCUMENTS

| | | | | | |
|---|---|---|---|---|---|
| 3,207,378 | A * | 9/1965 | Trumbull | G01F 11/021 | 222/134 |
| 3,642,175 | A * | 2/1972 | Robbins | B01F 15/0462 | 222/135 |
| 4,030,637 | A * | 6/1977 | Boden | B29B 7/7615 | 222/137 |
| 4,080,874 | A | 3/1978 | Burkhard | | |
| 4,132,483 | A * | 1/1979 | Slaats | G05D 11/132 | 366/138 |
| 4,189,070 | A * | 2/1980 | Macosko | B01F 5/0256 | 222/134 |
| 4,278,205 | A * | 7/1981 | Binoche | B05B 9/03 | 239/75 |
| 4,693,397 | A * | 9/1987 | Lang | B01F 15/0462 | 222/137 |
| 4,878,601 | A | 11/1989 | Flemming et al. | | |
| 5,158,438 | A * | 10/1992 | Olson | F04B 13/00 | 417/360 |
| 5,294,052 | A * | 3/1994 | Kukesh | B05B 7/06 | 239/112 |
| 5,305,917 | A * | 4/1994 | Miller | B01F 15/0237 | 222/137 |
| 5,524,983 | A * | 6/1996 | Dittgen | B67D 7/62 | 222/132 |
| 5,529,463 | A * | 6/1996 | Layer | F04B 1/02 | 128/DIG. 12 |
| 5,645,217 | A * | 7/1997 | Warren | B29B 7/7447 | 239/112 |
| 5,992,686 | A * | 11/1999 | Cline | B05B 12/1418 | 222/1 |
| 6,131,770 | A | 10/2000 | Allen | | |
| 6,168,308 | B1 * | 1/2001 | Pittman | B01F 15/0462 | 366/162.3 |
| 6,315,442 | B1 | 11/2001 | Jerkel | | |
| 6,588,926 | B2 | 7/2003 | Huber et al. | | |
| 6,719,921 | B2 | 4/2004 | Steinberger et al. | | |
| 7,380,977 | B2 | 6/2008 | Kamohara | | |
| 7,452,193 | B1 | 11/2008 | Wright | | |
| 8,974,111 | B2 | 3/2015 | Phallen | | |
| 2002/0044494 | A1 | 4/2002 | Steinberger et al. | | |
| 2002/0181321 | A1 | 12/2002 | Huber et al. | | |
| 2006/0120210 | A1 | 6/2006 | Kamohara | | |
| 2008/0144427 | A1 | 6/2008 | Phallen | | |
| 2013/0064696 | A1 * | 3/2013 | McCormick | B05B 12/1418 | 417/360 |
| 2013/0081715 | A1 * | 4/2013 | McCormick | B29B 7/7447 | 137/505.18 |
| 2013/0112624 | A1 | 5/2013 | Gebauer et al. | | |

FOREIGN PATENT DOCUMENTS

| | | | |
|---|---|---|---|
| CN | 101596514 | A | 12/2009 |
| CN | 103002979 | A | 3/2013 |
| DE | 1245809 | B | 7/1967 |
| EP | 08865829 | A2 | 9/1998 |
| FR | 2424070 | A1 | 11/1979 |
| GB | 2081397 | A | 2/1982 |
| JP | 05044677 | | 2/1993 |
| JP | 10122159 | A | 5/1998 |
| JP | 3122019 | | 6/2006 |
| JP | H03127657 | | 12/2006 |
| WO | WO2004042484 | A2 | 5/2004 |

OTHER PUBLICATIONS

International Search Report and Written Opinion for Application Serial No. PCT/US2015/065527, dated Apr. 1, 2016, 9 Pages.

International Search Report and Written Opinion for Application Serial No. PCT/US2011/001131, dated Dec. 10, 2012, 9 Pages.

Extended European Search Report for European Patent Application No. 11844333.2, dated Jan. 15, 2015, 4 pages.

Australian Patent Examination Report No. 1 for Australian Patent Application 2011337224, dated Feb. 4, 2015, 2 pages.

Chinese Office Action for Chinese Application No. 201180031187.6, dated May 28, 2014, 9 pages.

Notice of Reasons for Refusal for Japanese Patent Application No. 2013-516568, dated Jan. 7, 2015, 3 pages.

Russian Office Action for Russian Patent Application No. 2013102925, dated May 21, 2015, 7 pages.

Extended European Search Report for European Patent Application No. 15870794.3, dated May 8, 2018, 9 pages.

Office Action for Chinese Application No. 201580063588.8, dated Sep. 18, 2018, 11 pages.

Russian Office Action for RU Application No. 2017124747/28(042813), dated Apr. 4, 2019, pp. 13.

International Preliminary Report on Patentability for PCT Application No. PCT/US2015/065527, dated Jun. 20, 2017, 8 pages.

* cited by examiner

PLURAL COMPONENT PROPORTIONER COMPRISING A FIRST PUMP AND A SECOND PUMP SIMULTANEOUSLY DRIVEN BY A MOTOR CONNECTED TO THE PUMPS BY A YOKE ASSEMBLY COMPRISING A SHOE, A TIE PLATE INCLUDING A SLOT, AND A TIE ROD

BACKGROUND

Fluid proportioners include dispensing systems that receive separate inert fluid components, mix the components in a predetermined ratio, and then dispense the mixed components as an activated compound. For example, fluid proportioners can be used to dispense epoxies and polyurethanes that solidify after mixing of a resin component and an activating material, which are individually inert. However, after mixing an immediate chemical reaction begins taking place that results in the cross-linking, curing, and solidification of the mixture. Therefore, the two components are routed separately into the proportioner so that they can remain separate as long as possible. A sprayer receives and mixes the components so the mixture can be dispensed from the sprayer.

A typical fluid proportioner includes a pair of positive displacement pumps that individually draw in fluid from separate fluid hoppers and pump pressurized fluids to the mix manifold. The pumps are driven synchronously by a common motor, typically an air motor or hydraulic motor, having a reciprocating drive shaft. Such configurations are simple and easy to design when the fluid components are dispensed in a 1:1 ratio and the pumps are of equal volumetric displacement.

Many two component epoxies and polyurethanes are not comprised of a 1:1 ratio of the components. Often, a first major component is required in a higher proportion than a second minor component. In such a case, displacement of one pump is required to be larger than the other, which can complicate the design and operation of the fluid proportioner.

SUMMARY

In one embodiment, a two-component pumping system includes a first pump for pumping a first component, a second pump for pumping a second component, a motor, and a yoke assembly for connecting the motor to the first pump and the second pump and driving them simultaneously. The first pump includes a first displacement rod that reciprocates in a first pump axis. The second pump includes a second displacement rod that reciprocates in a second pump axis parallel to the first pump axis. The motor includes a drive shaft configured to reciprocate in a drive axis that is parallel to and in a common plane with the first and second pump axes. The motor is also configured to drive the first and second displacement rods in unison. The yoke assembly includes a top connector and a shoe. The top connector connects to the drive shaft. The shoe includes a first side and a second side. The first side connects to the first and second displacement rods. The second side adjustably connects to the top connector. Adjustment of the shoe moves the shoe and the first and second displacement shafts relative to the drive axis in a direction perpendicular to the first and second pump axes and within the common plane to balance moments between the drive shaft and the first and second displacement shafts.

In another embodiment, a two-component dispenser includes a first pump that pumps a first component, a second pump that pumps a second component, a motor for simultaneously driving the first pump and the second pump, and a yoke assembly for connecting the motor to the first pump and the second pump. The first pump reciprocates in a first pump axis. The second pump reciprocates in a second pump axis parallel to the first pump axis. The motor is configured to reciprocate in a drive axis that is parallel to and in a common plane with the first and second pump axes, and drive the first and second pumps in unison. The yoke assembly includes a top connector and a shoe. The top connector connects to the motor. The shoe includes a first side and a second side. The first side connects to the first and second pumps. The second side adjustably connects to the top connector. Adjustment of the shoe moves the shoe and the first and second pumps relative to the drive axis in a direction perpendicular to the first and second pump axes and within the common plane to balance moments between the motor and the first and second pumps.

In another embodiment, a method of assembling a two component pumping system includes connecting a motor having a drive axis to a top connector of a yoke assembly. A first pump having a first pump axis is connected to a shoe of the yoke assembly. A second pump having a second pump axis is connected to the shoe. The first pump axis, second pump axis, and drive axis are parallel and in a common plane. The top connector is inserted into the shoe. The shoe is adjusted relative to the top connector and perpendicular to the drive axis to balance moments between the motor and the first and second pumps.

DETAILED DESCRIPTION

Figure 1:
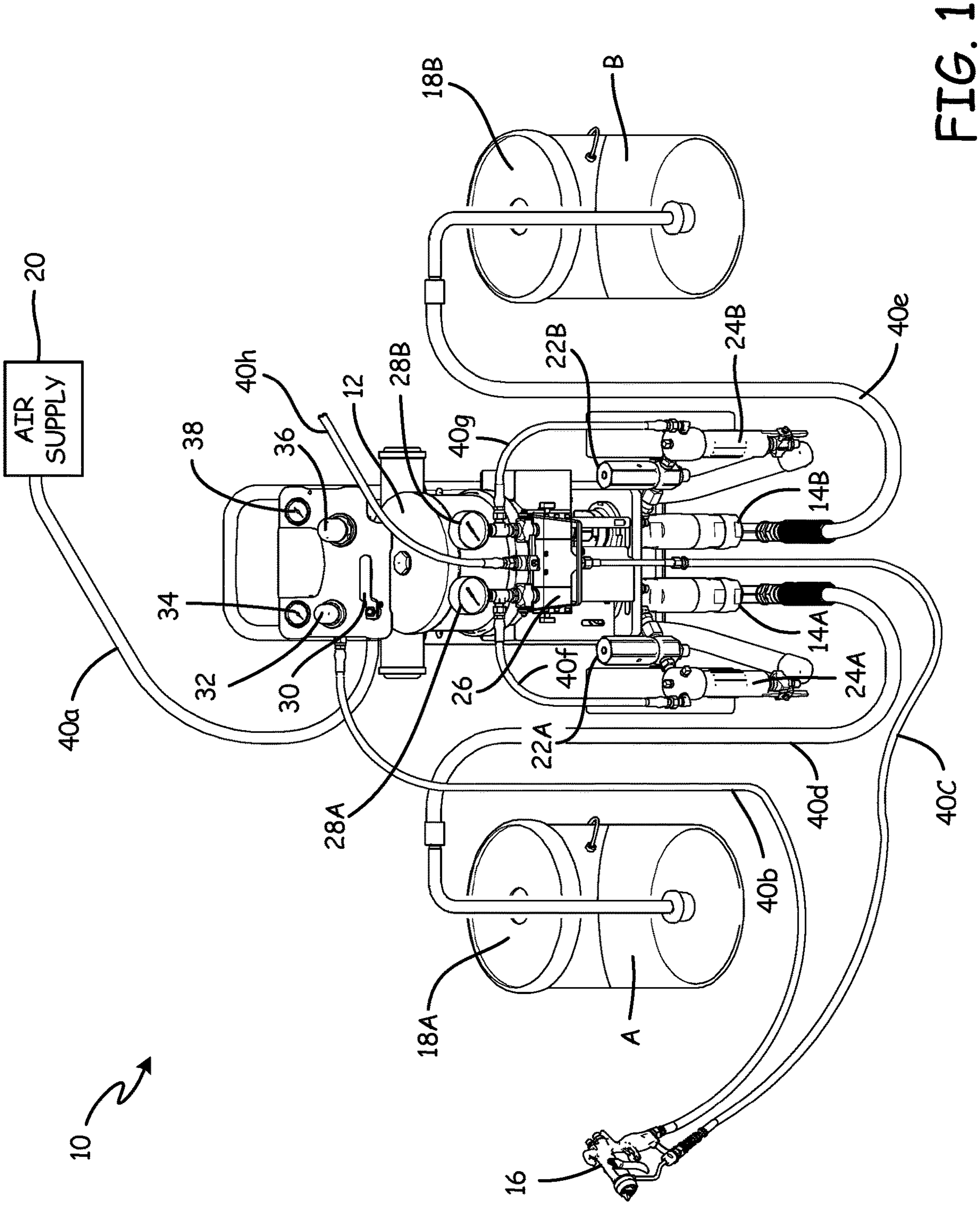
FIG. 1 is an isometric view of a two-component spray system.

FIG. 1 is an isometric view of spray system 10, which includes motor 12, pumps 14A and 14B, sprayer 16, component tanks 18A and 18B, air supply 20, pressure relief valves 22A and 22B, component filters 24A and 24B, manifold 26, component pressure gauges 28A and 28B, bleed air valve 30, sprayer pressure regulator 32, sprayer pressure gauge 34, motor pressure regulator 36, motor pressure gauge 38, and hoses 40*a*-40*h*. Also shown are fluid components A and B contained within component tanks 18A and 18B, respectively.

Motor 12 connects to and drives pumps 14A and 14B. Motor 12 is an air motor and is connected to air supply 20 through hose 40*a*. In between motor 12 and hose 40*a* is bleed air valve 30, which can connect directly to motor 12. Alternatively, motor 12 can connect to bleed air valve 30 or hose 40*a* through another hose (not shown).

Pump 14A has an inlet connected to component tank 18A by hose 40*d*, and an outlet connected to pressure relief valve 22A. Pressure relief valve 22A is connected to component filter 24A. The outlet of component filter 24A is connected to manifold 26 by hose 40*f*. Connected to hose 40*f* at manifold 26 is component pressure gauge 28A.

Pump 14B has an inlet connected to component tank 18B by hose 40*e*, and an outlet connected to pressure relief valve 22B. Pressure relief valve 22B is connected to component filter 24B. The outlet of component filter 24B is connected to manifold 26 by hose 40*g*. Connected to hose 40*g* at manifold 26 is component pressure gauge 28B.

Manifold 26 is connected to hose 40*h*, which can connect to a solvent flush system (not shown). Manifold 26 also is connected to sprayer 16 through hose 40*c*. Sprayer 16 is further connected to sprayer pressure regulator 32 by hose 40*b*.

Sprayer pressure regulator 32 also is connected to sprayer pressure gauge 34. Similarly, motor pressure regulator 36 is connected to motor pressure gauge 38. Motor pressure regulator 36 is connected to motor 12 by a hose (not shown).

In operation of one embodiment, pressurized air from air supply 20 is delivered to motor 12 and sprayer 16. Motor 12 powers pumps 14A and 14B to pump components A and B, respectively, from tanks 18A and 18B, respectively. Components A and B travel through pressure relief valves 22A and 22B, respectively, and filters 24A and 24B, respectively, before meeting at manifold 26. Components A and B are then mixed and sent to sprayer 16, where the mixture of components A and B are mixed with pressurized air, and can be controllably sprayed by a user with sprayer 16. Operation of spray system 10 is discussed below in greater detail.

Air supply 20 delivers pressurized air to motor 12 and sprayer 16. The pressurized air can be relieved from system 10 through bleed air valve 30, which, when actuated, relieves air stored between motor 12 and sprayer 16. Pressurized air that reaches motor 12 is used to power motor 12, which simultaneously drives pumps 14A and 14B.

Motor 12 is an air-powered reciprocating motor that drives a linearly reciprocating drive shaft. The drive shaft of motor 12 is coupled to displacement shafts of pumps 14A and 14B. As the drive shaft of motor 12 reciprocates, it drives the displacement shafts of pumps 14A and 14B to reciprocate, drawing in components A and B. Pump 14A draws in component A from tank 18A through hose 40*d*, and discharges component A to pressure relief valve 22A. Similarly, pump 14B draws in component B from tank 18B through hose 40*e*, and discharges component B to pressure relief valve 22B.

Component A travels through pressure relief valve 22A and into and through filter 24A, which filters unwanted contaminants or particles from component A. Component A then travels through hose 40*f* to manifold 26. Component B is pumped in a similar manner through pressure relief valve 22*b*, through filter 24B, and through hose 40*g* to manifold 26. Manifold 26 receives and combines components A and B into a mixture before sending the mixture to sprayer 16 through hose 40*c*. Components A and B can be thoroughly mixed in manifold 26, just downstream of manifold 26 in a mixer located in or attached to hose 40*c*, or can be mixed in sprayer 16.

Components A and B are fluid compounds such as an epoxy or polyurethane. Components A and B can be a catalyst and a resin, respectively. Components A and B are individually inert; however; after mixing in manifold 26, or somewhere downstream, an immediate chemical reaction begins taking place between components A and B that results in cross-linking, curing, and solidification of the mixture. In sprayer 16, the mixture contacts pressurized air received from air supply 20 through hose 40*b*.

Pressurized air delivered to sprayer 16 can be used to motivate a mixture traveling through hose 40*c*, or can be used to atomize the mixture at it passes through sprayer 16. A user can then controllably spray the mixture and pressurized air using sprayer 16. For example, a user can spray an atomized polyurethane on a surface with sprayer 16. In airless sprayer applications, which is another embodiment, no pressurized air is delivered to sprayer 16 and the mixture is only motivated by pumps 14A and 14B.

A user can adjust spray system 10 through sprayer pressure regulator 32 and motor pressure regulator 36. A user can adjust sprayer pressure regulator 32 up or down to increase or decrease the pressure of air delivered to sprayer 16. This can adjust the spray pressure, atomization, or a ratio of air to mixture of components A and B. Sprayer pressure gauge 34 indicates the pressure of air delivered to sprayer 16, providing operational feedback to a user.

A user can adjust motor pressure regulator 36 up or down to increase or decrease the pressure of the air delivered to motor 12. This can adjust the operating pressure of motor 12, which can have a direct impact on the operating pressure of each of pumps 14A and 14B. For example, if motor pressure regulator 36 is increased, motor 12 will reciprocate at a higher pressure, increasing the force transmitted to pump 14A and therefore increasing the operating pressure of pump 14A. Because pumps 14A and 14B are driven together, in unison, by motor 12, if pumps 14A and 14B are identically sized, an increase in pressure of motor 12 results in an equal increase in pressure of components A and B. In another embodiment, pumps 14A and 14B can be of different sizes, so that driving pumps 14A and 14B in unison will result in a flow rate ratio that is different than 1:1, as discussed below. Motor pressure gauge 38 indicates the air pressure delivered to motor 12, which provides operational feedback to a user.

Pumps 14A and 14B are double-action pumps, such as a 2-ball or 4-ball double action pump. This means linear motion of the displacement shafts of pumps 14A and 14B will motivate fluid to travel from the inlet of pumps 14A and 14B to their outlet. In other words, motion of displacement shafts of pumps 14A and 14B in either direction results in the pumping of components.

Motor 12 can be other types of motors in other embodiments, such as an electric motor, or a combustion motor. Also, in other embodiments, pumps 14A and 14B can be other types of pumps, such as single action pumps, or other constant displacement pumps.

Pressure relief valves 22A and 22B can be mechanical or electro-mechanical valves set to expel components A and B when components A and B reach a threshold pressure, or maximum pressure. For example, pressure relief valve 22A can be set to relieve component A, when component A reaches 2500 pounds per square inch of pressure.

Figure 2:
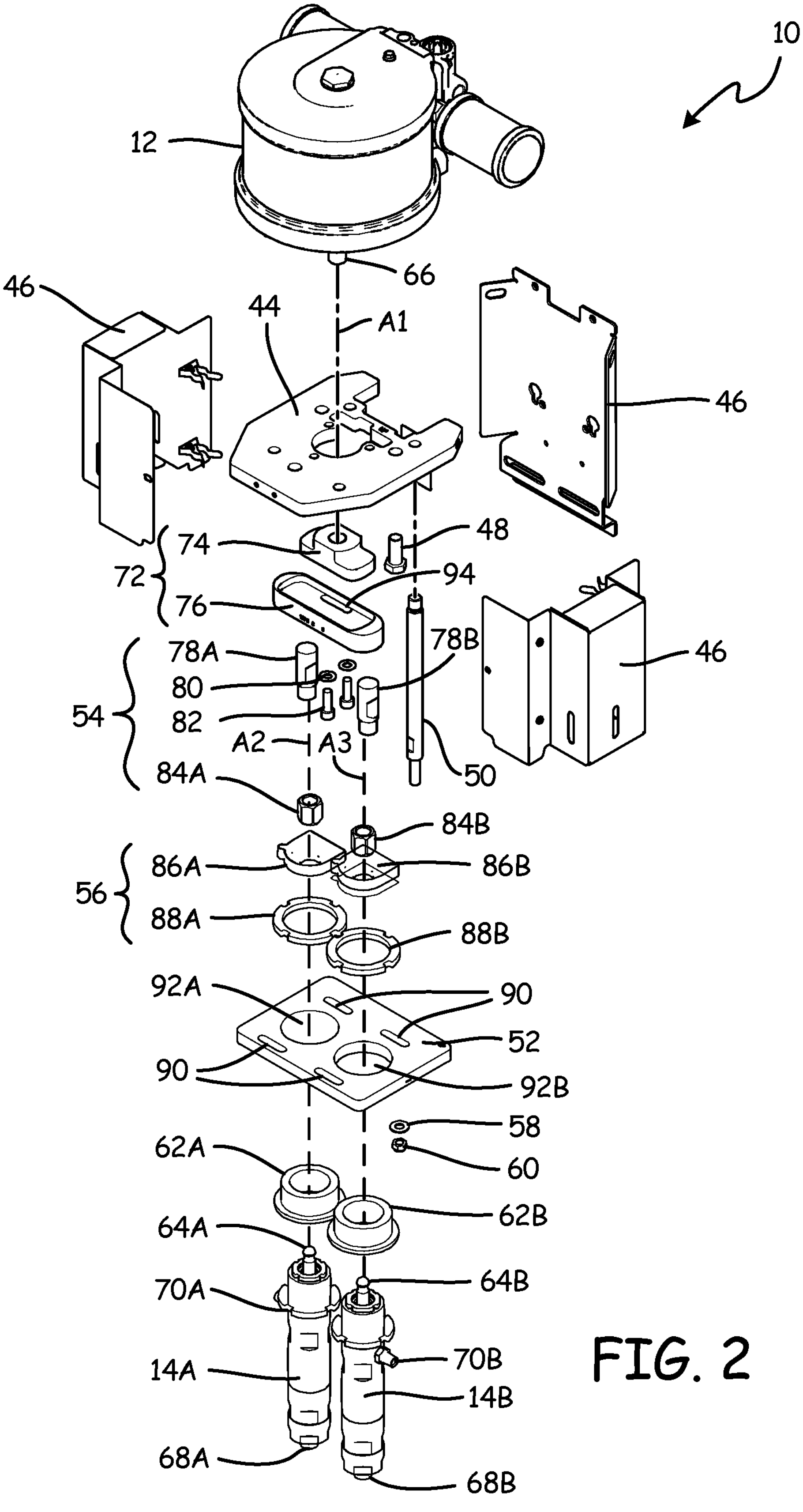
FIG. 2 is an exploded view of a portion of the two-component spray system of FIG. 1.

FIG. 2 is an exploded view of a portion of spray system 10. Spray system 10 includes motor 12, pumps 14A and 14B, motor mounting plate 44, pump casing 46, motor fasteners 48 (only one shown), tie rods 50 (only one shown), tie plate 52, connector assembly 54, pump mounting hardware 56, tie rod washers 58 (only one shown), tie rod nuts 60 (only one shown), and pump adapters 62A and 62B.

Motor 12 mounts to motor mounting plate 44, which is attached to and surrounded by pump casing 46. Motor fasteners 48 secure motor 12 to motor mounting plate 44. Pumps 14A and 14B mount to tie plate 52 with pump mounting hardware 56 and pump adapters 62A and 62B. Tie rods 50 fasten to motor mounting plate 44, and are secured to tie plate 52 with tie rod washer 58 and tie rod nut 60. Tie rods 50 secure motor mounting plate 52 and therefore motor 12 relative to pumps 14A and 14B and tie plate 52. Connector assembly 54 is connected motor 12 to pumps 14A and 14B, and allows for adjustments between the axes of motor 12 and pumps 14A and 14B. The components discussed are described in further detail below.

Motor 12 includes drive shaft 66. Pump 14A includes displacement shaft 64A, pump inlet 68A, and pump outlet 70A. Pump 14B includes displacement shaft 64B, pump inlet 68B, and pump outlet 70B. Connector assembly 54 includes yoke assembly 72, which includes top connector 74, and shoe 76. Connector assembly 54 also includes connecting rods 78A and 78B, shoe washers 80, shoe bolts 82, and coupling nuts 84A and 84B. Pump mounting hardware 56 includes coupling reservoirs 86A and 86B, and pump retaining rings 88A and 88B. Tie plate 52 includes tie rod slots 90, and pump mounting bores 92A and 92B. Shoe 76 includes shoe slots 94 (one slot is only partially visible). Also shown are axes A1-A3, which are parallel to another and lie in a common plane.

Pump inlets 68A and 68B are located at the bottom of each of Pumps 14A and 14B. Pump inlets 68A and 68B connect to hoses 40*d* and 40*e*, respectively (as shown in FIG. 1). Pump outlets 70A and 70B are located near the top of each of pumps 14A and 14B. Pumps 14A and 14B pump components A and B, respectively from pump inlets 68A and 68B to outlets 70A and 70B, as discussed above.

Motor 12 is secured to motor mounting plate by three of motor fasteners 48, which pass through motor mounting plate 44 and thread into motor 12. Drive shaft 66 is coupled to a piston (not shown) within motor 12. The other end of drive shaft 66 passes through motor mounting plate 44 and couples to yoke assembly 72, specifically coupling to top connector 74. Drive shaft 66 couples to the center of top connector 74 along axis A1.

Top connector 74 of yoke assembly is also connected to shoe 76. Shoe 76 is an obround cylinder, having a flat first side and a recessed second side. Top connector 74 is an obround cylinder, tapered at a tope side, which connects to drive shaft 66. The outer perimeter of top connector 74 is slightly smaller than the inner perimeter of the second side of shoe 76. In one embodiment, top connector 74 inserts into shoe 76. Top connector 74 is secured to shoe 76 by shoe washers 80 and shoe bolts 82. Shoe bolts 82 pass through shoe washers 80 and also through shoe slots 94 of shoe 76. Shoe bolts 82 are then threaded into top connector 74. Because shoe slots 94 form a slot in which a portion of shoe bolts 82 can move, top connector 74 can be mounted in several positions relative to shoe 76, which can have benefits that are discussed below.

Shoe 76 also is connected to connecting rods 78A and 78B through a threaded interface, though other connection interfaces can be used. Connecting rods 78A and 78B connect to shoe 76 on a first side of shoe 76. Top connector 74 mounts to shoe 76 on a second side of shoe 76, opposite the first side of shoe 76. Connecting rods 78A and 78B are also coupled to displacement shafts 64A and 64B with coupling nuts 84A and 84B, respectfully. That is, connecting rod 78A is coupled to displacement shaft 64A using coupling nut 84A, and connecting rod 78B is coupled to displacement shaft 64B using coupling nut 84B. Connecting rod 78A couples to displacement shaft 64A along axis A2 and connecting rod 78B couples to displacement shaft 64B along axis A3.

Pumps 14A and 14B are mounted to pump adapters 62A and 62B, which also mount to tie plate 52. More specifically, radially inner surfaces of pump adapters 62A and 62B thread onto pumps 14A and 14B. Pump adapters 62A and 62B are then inserted through pump mounting bores 92A and 92B. Retaining rings 88A and 88B are then threaded onto a radial outer surface of pump adapters 62A and 62B, respectively, securing pumps 14A and 14B to tie plate 52. Coupling reservoirs 86A and 86B are secured between the top of pumps 14A and 14B and coupling nuts 84A and 84B, respectively. Coupling reservoirs 86A and 86B can allow the throat area of pumps 14A and 14B to be flooded with a plasticizer.

Tie rods 50 fasten to motor mounting plate 44. Tie rods 50 can thread into motor mounting plate 44, or can be secured with a nut, bolt, or the like. The opposite ends of tie rods 50 pass through tie rod slots 90 of tie plate 52 and are secured on the underside of tie plate 52 with tie rod washers 58 and tie rod nuts 60. When mounted, tie rods 50 secure motor mounting plate 44 to tie plate 52. Because motor 12 is secured to motor mounting plate 44 and because pumps 14A and 14B are secured to tie plate 52, tie rods 50 secure motor 12 relative to pumps 14A and 14B. This fixes motor 12 to pumps 14A and 14B transversely to axes A1-A3. However, pumps 14A and 14B are still adjustable relative to motor 12 in a direction perpendicular to axes A1-A3.

Pumps 14A and 14B are coupled to motor 12 in two ways. First, displacement shafts 64A and 64B are coupled to drive shaft 66 through connector assembly 54. Second, pumps 14A and 14B are secured to tie plate 52, which is attached to motor mounting plate 44 and therefore motor 12 through tie rods 50. In this arrangement, axis A1 of drive shaft 66 and axes A2 and A3 of displacement rods 64A and 64B are aligned in the same plane by yoke assembly 72.

In operation of one embodiment, yoke assembly 72 allows pumps 14A and 14B and therefore displacement rods 64A and 64B and axes A2 and A3 to move in plane with and relative to drive shaft 66 and axis A1. This movement is enabled by the connection between yoke assembly 72 and the interface between tire rods 50 and tie plate 52.

Tie rods 50 are fixed to motor mounting plate 44. However, tie rods 50 are not completely fixed relative to tie plate 52. Tie rods 50 can move within slot 90. This allows pumps 14A and 14B and tie plate 52 to move relative to tie rods 50 and therefore relative to motor 12. Slots 90 can be configured to allow tie rods 50 to move along the entire travel of shoe 76 relative to top connector 74

For pumps 14A and 14B, which are fixed to tie plate 52, to move relative to motor 12, the connection between pumps 14A and 14B and motor 12 should be changed. This change occurs at the interface between top connector 74 and shoe 76. Shoe slot 94 of shoe 76 allows shoe bolts to secure top connector to shoe 76 at various locations. This enables shoe 76 to move with pumps 14A and 14B, while top connector 74 stays fixed with motor 12. This means displacement shafts 64A and 64B can move perpendicularly to drive shaft 66, while axes A2 and A3 remain coplanar with axis A1. This adjustment allows for forces and moments between motor 12 and pumps 14A and 14B, caused by size (volume) differences between pumps 14A and 14B, to be balanced, reducing wear on motor 12, pumps 14A and 14B, connector assembly 54, mounting hardware 56, and various other components of spray system 10. Shoe slots 94 can be configured to allow shoe 76 to move along the entire travel of shoe 76 relative to top connector 74.

Figure 3:
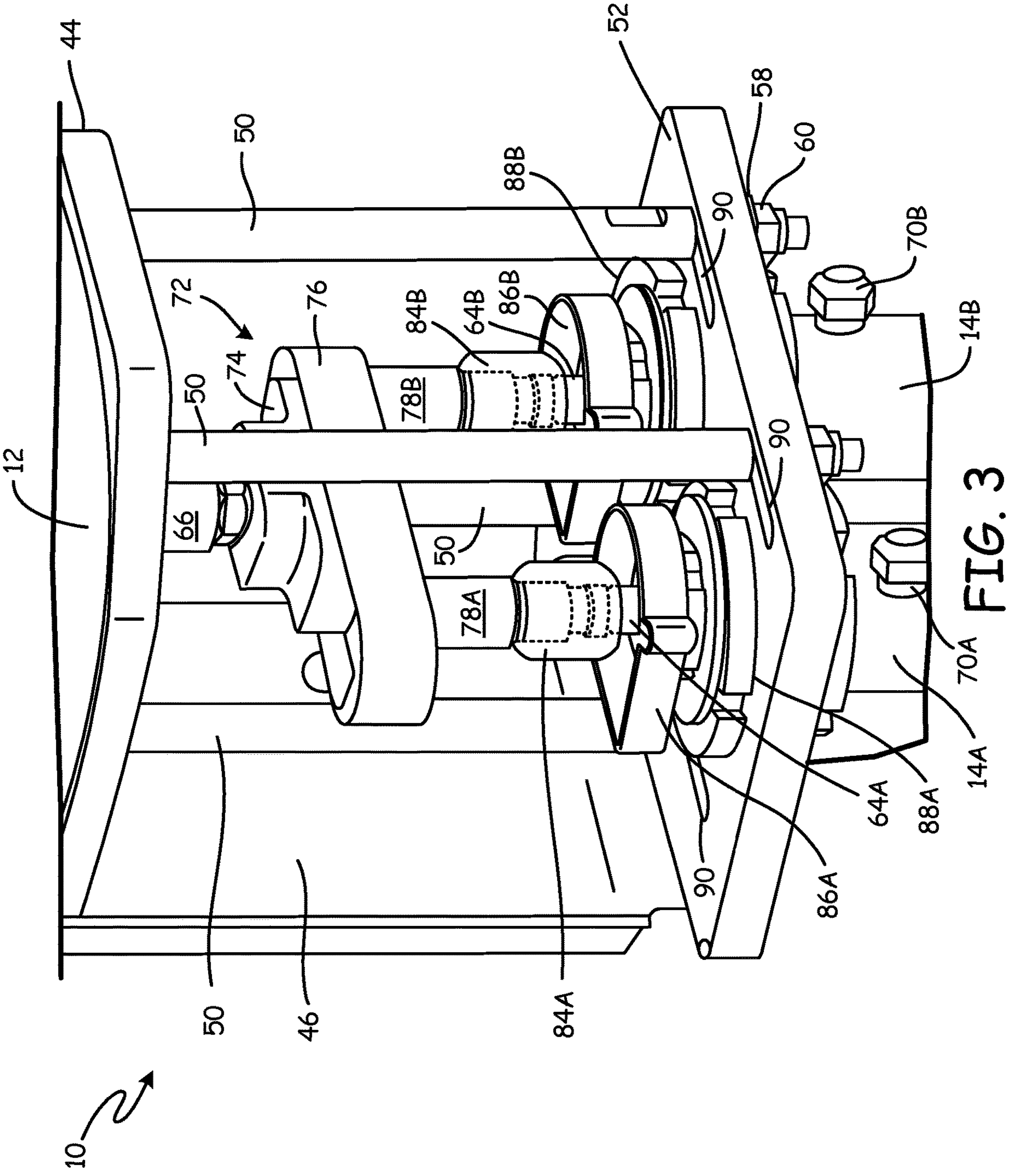
FIG. 3 is an isometric view of a focused portion the two-component spray system of FIG. 1.

FIG. 3 is an isometric view of a focused portion of spray system 10, which includes motor 12, pumps 14A and 14B, motor mounting plate 44, pump casing 46, tie rods 50, tie plate 52, tie rod washers 58, tie rod nuts 60, and pump adapters 62. Motor 12 includes drive shaft 66. Pump 14A includes displacement shaft 64A and pump outlet 70A. Pump 14B includes displacement shaft 64B and pump outlet 70B. Yoke assembly 72 includes top connector 74, and shoe 76. Spray system 10 also includes connecting rods 78A and 78B, and coupling nuts 84A and 84B, coupling reservoirs 86A and 86B, and pump retaining rings 88A and 88B. Tie plate 52 includes tie rod slots 90.

FIG. 3 shows motor 12 fully connected to pumps 14A and 14B. Drive shaft 66 is coupled to the top and center of top connector 74. Top connector 74 of yoke inserts into shoe 76, where it can be secured in various positions relative to coupling rods 78A and 78B. Shoe 76 also is connected to connecting rods 78A and 78B, which are coupled to displacement shafts 64A and 64B by coupling nuts 84A and 84B, respectfully.

Pumps 14A and 14B are mounted to pump adapters 62A and 62B (of FIG. 2), which also mount to tie plate 52. Retaining rings 88A and 88B are threaded onto pump adapters 62A and 62B, respectively, securing pumps 14A and 14B to tie plate 52. Coupling reservoirs 86A and 86B are secured between the top of pumps 14A and 14B and coupling nuts 84A and 84B.

Tie rods 50 connect to motor mounting plate 44. The opposite end of tie rods 50 pass through tie rod slots 90 and are secured on the underside of tie plate 52 with tie rod washers 58 and tie rod nuts 60. This secures motor 12 and motor mounting plate 44 to tie plate 52 and also secures motor 12 relative to pumps 14A and 14B. Further, because displacement shafts 64A and 64B are coupled to drive shaft 66 through yoke assembly 72, connecting rods 78A and 78B, and coupling nuts 84A and 84B, drive shaft 66 is partially fixed relative to displacement shafts 64A and 64B. As discussed above, the position of displacement shafts 64A and 64B can be adjusted relative to drive shaft 66.

When drive shaft 66 and displacement shafts 64A and 64B are coupled to yoke assembly 72, they are locked into planar alignment. Additionally, securing drive shaft 66 to displacement shafts 64A and 64B means that they will reciprocate in unison, or synchronously. Yoke assembly 72 does not allow for movement of drive shaft 66 relative to displacement shafts 64A and 64B in a direction transverse to axes A1-A3 (of FIG. 2). However, yoke assembly 72 does allow for displacement shafts 64A and 64B to be moved relative to drive shaft 66 in a direction perpendicular to axes A1-A3 (of FIG. 2).

In operation of one embodiment, adjustment of yoke assembly 72 can be performed during assembly of spray system 10, or after initial assembly of spray system 10 during a set-up of spray system 10. For example, tie rod nuts 60 and tied rod washers 58 can be loosened from tie plate 52. Similarly shoe washers 80 and shoe bolts 82 (of FIG. 2) can be loosened from shoe 76, but not removed.

This allows shoe 76 to translate relative to top connector 74 as shoe bolts 82 can move with top connector 74, within shoe slots 94 (of FIG. 2). Similarly, tie rods 50 can translate along slots 90. This allows pump 14A and 14B, mounting plate 52, and shoe 76 to translate relative to top connector 74 and motor 12. After shoe 76 and top connector 74 are aligned as desired, shoe washers 80 and shoe bolts 82 and tie rod washers 58 and tie rod bolts 60 can be retightened. This locks the position of shoe 76 to top connector 74, locking the position of drive shaft 66 relative to displacement shafts 64A and 64B.

Figure 4A:
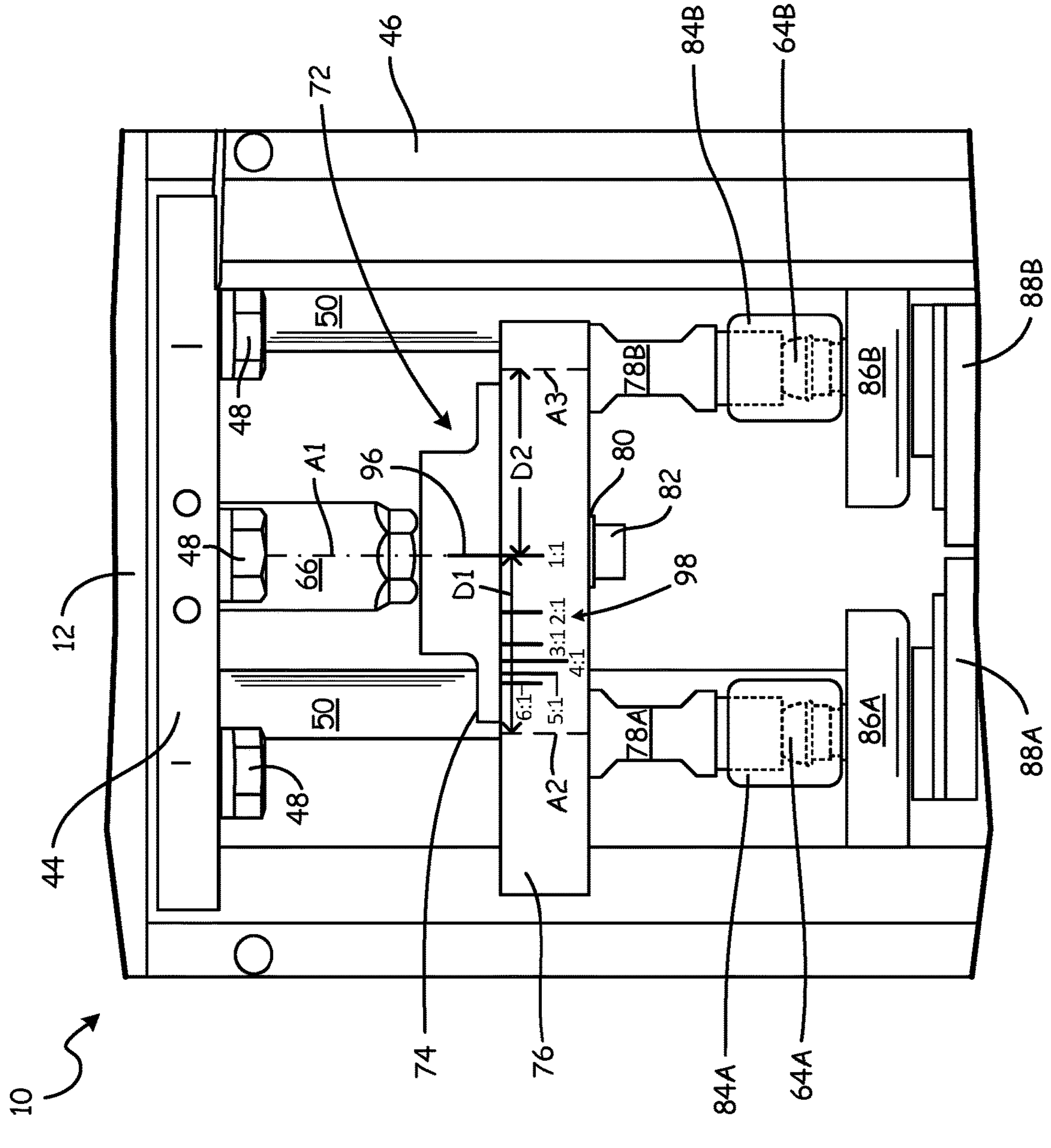
FIG. 4A is an elevation view of a focused portion the two-component spray system of FIG. 1 in a 1:1 dispensing ratio configuration.
Figure 4B:
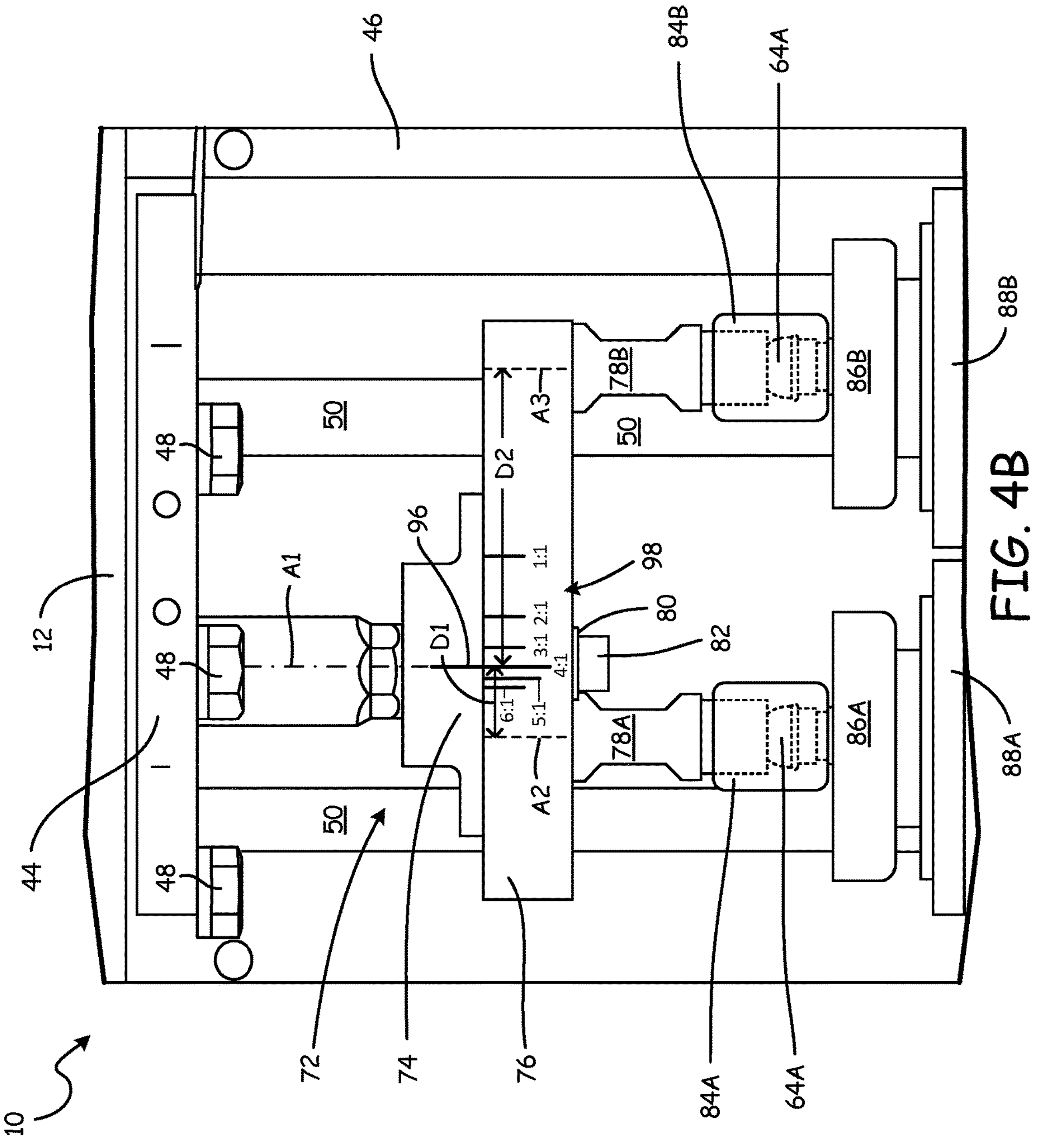
FIG. 4B is an elevation view of a focused portion the two-component spray system of FIG. 1 in a 4:1 dispensing ratio configuration.

FIG. 4A is an elevation view of a focused portion of spray system 10 in a 1:1 dispensing ratio configuration and FIG. 4B is an elevation view of a focused portion of spray system 10 in a 4:1 dispensing ratio configuration. FIGS. 4A and 4B are discussed concurrently.

Spray system 10 includes motor 12, pumps 14A and 14B, motor mounting plate 44, pump casing 46, and tie rods 50. Motor 12 includes drive shaft 66. Pump 14A includes displacement shaft 64A. Pump 14B includes displacement shaft 64B. Yoke assembly 72 includes top connector 74, and shoe 76. Spray system 10 also includes connecting rods 78A and 78B, coupling nuts 84A and 84B, coupling reservoirs 86A and 86B, and pump retaining rings 88A and 88B. Top connector 74 includes centerline notch (indicium) 96. Shoe 76 includes pump ratio notches (indicia) 98, which include notches (indicia) 1:1, 2:1, 3:1, 4:1, 5:1, and 6:1. Also shown are axes A1-A3 and dimensions D1 and D2.

The components of spray system 10 shown in FIGS. 4A and 4B are connected consistently with FIGS. 1-3. FIGS. 4A and 4B further show centerline notch 96 on top connector 74, which is located at the center of top connector 74 and drive shaft 66. Centerline notch 96 is a visual indicator of the center of top connector 74 and drive shaft 66. Also shown in FIG. 4A are pump ratio notches 98. Pump ratio notches 98 can be aligned with centerline notch 96 to visually indicate when moments between displacement shafts 64A and 64B and drive shaft 66 are balanced for various pump configurations. Distance D1 is the distance between Axis A2 and axis A1 or centerline notch 96. Distance D2 is the distance between axis A3 and axis A1 or centerline notch 96.

For example, as shown in FIG. 4A, if pumps 14A and 14B are equally sized, moments between displacement shafts 64A and 64B and drive shaft 66 are balanced when centerline notch 96 is aligned with notch 1:1, or when distance D1 equals distance D2. When pumps 14A and 14B are not of the same size, a force and moment imbalance between displacement shafts 64A and 64B, yoke assembly 72, and drive shaft 66 can arise. In this instance, shoe 76 can be moved, as described above, to another of pump ratio notches 98, such as notch 4:1, as shown in FIG. 4B. This adjustment makes distance D1 greater than distance D2, balancing the moments between these components, reducing wear and component failure. The details of this are discussed below.

In one embodiment, each pump is a piston cylinder assembly, where the volume of each stroke is represented by the equation:

$$V=A*L \quad \text{(Eq. 1)}$$

Where V is the volume of each stroke, A is the area of a cylinder within each pump, and L is the length of the stroke of displacement rods 64A and 64B. When pumps 14A and 14B produce the same volumetric flow rate, the area, length, and volume for each of pumps 14A and 14B will also be the same. However, pumps 14A and 14B can be of different sizes. In this case, each pump is represented by:

$$V1=A1*L1 \quad \text{(Eq. 2)}$$

$$V2=A2*L2 \quad \text{(Eq. 3)}$$

Here, V1 is the volume of pump 14A, A1 is the area of the cylinder within pump 14A, L1 is the length of the stroke of displacement rod 64A, V2 is the volume of pump 14B, A2 is the area of the cylinder within pump 14B, and L2 is the length of the stroke of displacement rod 64A. Because pumps 14A and 14B are commonly driven by drive shaft 66, the length of the stroke of displacement shafts 64A and 64B is equal. Therefore:

$$L1=L2=L \quad \text{(Eq. 4)}$$

The volumetric flow rate for each pump can be expressed by the equation:

$$Q=V/t \quad \text{(Eq. 5)}$$

Where Q is the volumetric flow rate and t is time. Because pumps 14A and 14B are driven by drive shaft 66, the strokes of displacement shafts 64A and 64B are equal in distance and time. This means the volumetric flow rate of each of pumps 14A and 14B can expressed as:

$$Q=V/S \quad \text{(Eq. 6)}$$

Where S is a stroke. The volumetric flow rate for each pump can then be expressed as:

$$Q1=V1S \quad \text{(Eq. 7)}$$

$$Q2=V2/S \quad \text{(Eq. 8)}$$

Where Q1 is the volumetric flow rate for pump 14A and Q2 is the volumetric flow rate for pump 14B.

Also, when drive shaft 66 drives each of pumps 14A and 14B, it does so by applying a force to pumps 14A and 14B. Forces F1 and F2 are both applied by motor 12, and are therefore dictated by the physical properties and operations of pumps 14A and 14B, given by:

$$F1=P*A1 \quad \text{(Eq. 9)}$$

$$F2=P*A2 \quad \text{(Eq. 10)}$$

Where P is the pressure applied onto the piston of each pump. Because each of pumps 14A and 14B deliver fluid to a common area, the pressures should be equivalent.

The axes of pumps 14A and 14B (A2 and A3) cannot be collinear with drive shaft 66 (axis A1), because pumps 14A and 14B are driven by a single motor 12. Accordingly, axis A2 is offset from axis A1 by distance D1, and axis A3 is offset from axis A1 by distance D1. This means the force applied by drive shaft 66 is offset from forces F1 and F2 by distances D1 and D2, respectively. This creates moments of force on connector assembly 54, represented by:

$$M1=F1*D1 \quad \text{(Eq. 11)}$$

$$M2=F2*D2 \quad \text{(Eq. 12)}$$

Where M1 is the moment created by force F1 and moment M2 is the moment created by force F2. Moment M1 is between drive shaft 66 and displacement shaft 64A and moment M2 is between drive shaft 66 and displacement shaft 64B.

Moments M1 and M2 apply torque on connection assembly 54. For example, moment M1 applies a torque on the connection between connecting rod 78A and shoe 76. Moreover, both moments M1 and M2 apply torque on top connector 74, shoe 76, and the hardware connecting top connector 74 and shoe 76. When moments M1 and M2 are not equal, horizontal forces transmitted through connecting assembly 54 are not equally applied to drive shaft 66, which wears motor 12. Similarly, imbalanced horizontal forces created by uneven moments M1 and M2 are applied to displacement shafts 64A and 64B, which can wear one or both of pumps 14A and 14B at a faster than normal rate. This wear can be reduced or prevented by balancing M1 and M2 when pumps 14A and 14B create unequal moments (when pumps 14A and 14B do not have the same volumetric flow rate). That is, when pumps 14A and 14B are not equally sized, it is desirable when:

$$M1=M2 \quad \text{(Eq. 13)}$$

Substituting equations 11 and 12, equation 13 can be expressed as:

$$F1*D1=F2*D2 \quad \text{(Eq. 14)}$$

Substituting in equations 9 and 10, results in the equation:

$$P*A1*D1=P*A2*D2 \quad \text{(Eq. 15)}$$

Because the pressures are equal, they cancel, resulting in the equation:

$$A1*D1=A2*D2 \quad \text{(Eq. 16)}$$

Substituting in equations 2-4 results in the equation:

$$(V1/L)*D1=(V2/L)*D2 \quad \text{(Eq. 17)}$$

Because stroke length L is the same on each side of the equation, equation 17 reduces to:

$$V1*D1=V2*D2 \quad \text{(Eq. 18)}$$

Then, the volumetric flow rate can be accounted for with equations 7 and 8:

$$Q1*S*D1=Q2*S*D2 \quad \text{(Eq. 19)}$$

Because pumps 14A and 14B have identical strokes, S cancels, resulting in:

$$Q1*D1=Q2*D2 \quad \text{(Eq. 20)}$$

This can be alternatively expressed as:

$$Q1Q2=D2D1 \quad \text{(Eq. 21)}$$

In other words, for moments M1 and M2 to balance, the ratio of volumetric flow rate Q1 of pump 14A and flow rate Q2 of pump 14B should be inverse to the ratio of distance D1 to distance D2.

For example, pump 14A can have a stroke volume of 100 cubic centimeters (cc), and pump 14B can have a volume of 25 cubic centimeters. Then, applying equation 21 to balance moments M1 and M2 gives:

$$100\text{ cc}/25\text{ cc}=D2/D1 \quad \text{(Eq. 22)}$$

Which reduces to:

$$D2=4*D1 \quad \text{(Eq. 23)}$$

Therefore, to balance moments caused by a pumping ratio between pump 14A and 14B of 4:1 (100 cc to 25 cc), distance D2 should be four times distance D1.

Referring to FIG. 4B, ratio notch 4:1 is aligned with centerline notch 96, and distance D2 is four times distance D1. Therefore, by aligning centerline notch 96 to alternate ratio notch 4:1, a user can quickly balance moments caused by a pumping ratio between pump 14A and 14B of 4:1. Similar adjustments can be made for a pumping ratio between pump 14A and 14B of 1:1, 2:1, 3:1, 5:1, and 6:1.

These features allow a user to install pumps having various volumetric flow rate ratios in spray system 10, and then adjust the position of shoe 76 relative to top connector 74, to balance moments M1 and M2. Adjustments can be made at a factory, so that spray system 10 can be sold to customers who wish to apply various fluids requiring different application ratios. Alternatively, adjustments can be made by a user who wants to spray different mixtures using components that have different application rates.

By pre-calculating, pre-measuring, and marking pump ratio notches 98 clearly on shoe 76, minimal calculations are required to install a set of pumps 14A and 14B having different volumetric flow rates. This saves time, and reduces the likelihood of errant installation. Also, yoke assembly 72 is not a coupling device that is expensive to manufacture, which saves cost of producing spray system 10.

In one embodiment, shoe 76 is designed so that notch 1:1 aligns with centerline notch 96 off-center to shoe 76. This enables shoe 76 to slide in only one direction to pump ratio notches 98, simplifying adjustment of spray system 10.

Although the present invention has been described with reference to preferred embodiments, workers skilled in the art will recognize that changes may be made in form and detail without departing from the spirit and scope of the invention.

The invention claimed is:

1. A two-component pumping system comprising:
- a first pump for pumping a first component, the first pump including a first pump body and a first displacement rod extending from the first pump body and that reciprocates in a first pump axis;
- a second pump for pumping a second component, the second pump including a second pump body and a second displacement rod extending from the second pump body and that reciprocates in a second pump axis parallel to the first pump axis;
- a motor for simultaneously driving the first pump and the second pump, the motor including a drive shaft configured to:
  - reciprocate in a drive axis that is parallel to and in a common plane with the first and second pump axes; and
  - drive the first and second displacement rods in unison;
- a yoke assembly for connecting the motor to the first pump and the second pump, the yoke assembly comprising:
  - a top connector connected to the drive shaft; and
  - a shoe comprising:
    - a first side connected to the first and second displacement rods; and
    - a second side adjustably connected to the top connector, wherein adjustment of the shoe moves the shoe and the first and second displacement rods relative to the drive axis in a direction perpendicular to the first and second pump axes and within the common plane to balance moments between the drive shaft and the first and second displacement rods;
- a motor support on which the motor is mounted;
- a tie plate to which the first pump body and the second pump body are mounted and through which the first pump body and the second pump body extend, wherein the tie plate includes a slot; and
- a tie rod connected to the motor support and the tie plate;
- wherein the tie rod is configured to move within the slot allowing the first and second pumps, tie plate, and shoe to move perpendicularly to the drive axis and relative to the top connector, motor, and motor support.

2. The two-component pumping system of claim 1, wherein the top connector inserts into the shoe, such that the top connector is configured to slide within the shoe moving the first and second displacement rods perpendicular to the first and second pump axes relative to the drive axis and within the common plane to balance moments between the drive shaft and the first and second displacement rods.

3. The two-component pumping system of claim 1, further comprising a centerline indicium on the top connector and a centering indicium on the shoe that, when in alignment, are configured to indicate that the first and second displacement rods are equally offset from the drive shaft.

4. The two-component pumping system of claim 3, wherein the first and second pumps are of different sizes, and are configured to pump at different rates.

5. The two-component pumping system of claim 4, wherein the shoe further comprises an alternate ratio indicium that, when in alignment with the centerline indicium of the top connector, is configured to balance moments between the motor and the differently sized first and second pumps.

6. The two-component pumping system of claim 5, wherein the alternate ratio indicium comprises a plurality of alternate ratio indicia.

7. The two-component pumping system of claim 5, wherein the motor support comprises a motor mounting plate.

8. The two-component pumping system of claim 1, further comprising a plurality of tie rods, and wherein the tie plate further comprises a plurality of slots.

9. The two-component pumping system of claim 2, wherein the shoe further comprises a slot for receiving a fastener therethrough to secure the top connector to the shoe at various positions of the top connector relative to the shoe.

10. The two-component pumping system of claim 1, further comprising a sprayer connected to the first pump and the second pump, configured to mix the first and second components, and configured to controllably spray the mixture of the first and second components.

11. The two-component pumping system of claim 10, wherein the sprayer is configured to spray a mixture of the first and second component in varying ratios.

12. A two-component pumping system comprising:
- a first pump that pumps a first component and includes a first pump body and a first displacement rod extending from the first pump body and that reciprocates in a first pump axis;
- a second pump that pumps a second component and includes a second pump body and a second displacement rod extending from the second pump body and that reciprocates in a second pump axis parallel to the first pump axis;
- a tie plate to which the first pump body and the second pump body are mounted and through which the first pump body and second pump body extend, the tie plate including a slot;
- a motor for simultaneously driving the first pump and second pump, the motor including a drive shaft configured to:
  - reciprocate in a drive axis that is parallel to and in a common plane with the first and second pump axes; and
  - drive the first and second pumps in unison;
- a motor support on which the motor is mounted;
- a tie rod connected to the motor support and the tie plate and received in the slot;
- a yoke assembly for connecting the motor to the first pump and second pump, the yoke assembly comprising:
  - a top connector connected to the motor; and
  - a shoe comprising:
    - a first side connected to the first and second pumps; and
    - a second side adjustably connected to the top connector, wherein adjustment of the shoe moves the shoe and the first and second pumps relative to the drive axis in a direction perpendicular to the first and second pump axes and within the common plane to balance moments between the motor and the first and second pumps;
- wherein the tie rod is configured to move within the slot allowing the first and second pumps, tie plate, and shoe to move perpendicularly to the drive axis and relative to the top connector, motor, and motor support.

13. The two-component pumping system of claim 12, wherein the top connector inserts into the shoe, such that the top connector is configured to slide within the shoe.

14. The two-component pumping system of claim 12, further comprising a centerline indicium on the top connector and a centering indicium on the shoe that, when in alignment, are configured to indicate that the first and second pumps are equally offset from the motor.

15. The two-component pumping system of claim 14, wherein the first and second pumps are of different sizes, and are configured to pump at different rates.

16. The two-component pumping system of claim 15, wherein the shoe further comprises an alternate ratio indicium that, when in alignment with the centerline indicium of the top connector, is configured to balance moments between the motor and the differently sized first and second pumps.

17. The two-component pumping system of claim 16, wherein the motor support comprises a motor mounting plate.

18. A method of assembling a two component pumping system, the method comprising:

connecting a motor mounted on and supported by a motor support and having a drive axis to a top connector of a yoke assembly;

connecting a first pump having a first pump axis to a shoe of the yoke assembly, the first pump including a first pump body mounted to and extending through a tie plate having a slot;

connecting a second pump having a second pump axis to the shoe, wherein the first pump axis, second pump axis, and drive axis are parallel and in a common plane, the second pump including a second pump body mounted to and extending through the tie plate;

inserting the top connector into the shoe; and adjusting the shoe relative to the top connector and perpendicular to the drive axis by moving a tie rod in the slot such that the first pump, second pump, tie plate, and shoe shift relative to the top connector, motor, and motor support to balance moments between the motor and the first and second pumps.

19. The method of claim 18, wherein the first and second pumps are of different sizes, and are configured to pump at different rates.

20. The method of claim 19 and further comprising;

connecting the motor to a motor mounting plate;

connecting the first and second pump to the tie plate; and connecting the motor mounting plate and the tie plate with the tie rod, wherein the tie rod is configured to fix the position of the motor relative to first and second pumps transverse to the first and second pump axes and the drive axis.

* * * * *